United States Patent [19]

Smith

[11] Patent Number: 5,048,580

[45] Date of Patent: Sep. 17, 1991

[54] WORKPIECE GUIDE FOR PORTABLE POWER ROUTER

[76] Inventor: Ralston R. Smith, 2355 Atlas Peak Rd., Napa, Calif. 94558

[21] Appl. No.: 550,293

[22] Filed: Jul. 9, 1990

[51] Int. Cl.$^5$ ............................ B27C 5/10; B27C 5/04
[52] U.S. Cl. ............................ 144/134 D; 144/136 C; 144/371; 144/253 R
[58] Field of Search ............................ 409/182, 175; 144/253 R, 134 R, 134 D, 136 C, 371

[56] References Cited

U.S. PATENT DOCUMENTS

| | | | |
|---|---|---|---|
| 2,587,994 | 3/1952 | Gregory | 144/136 C |
| 2,943,655 | 7/1960 | Pedersen et al. | 144/136 C |
| 4,718,468 | 1/1988 | Cowman | 144/136 C |
| 4,919,176 | 4/1990 | Gachet et al. | 144/136 C |

*Primary Examiner*—W. Donald Bray

[57] ABSTRACT

An attachable workpiece guide for a portable power router which in combination with the planar router base defines a workpiece guide surface relative to the router bit. The guide surface is adjustable relative to the bit so as to accommodate a preselected depth of cut.

5 Claims, 2 Drawing Sheets

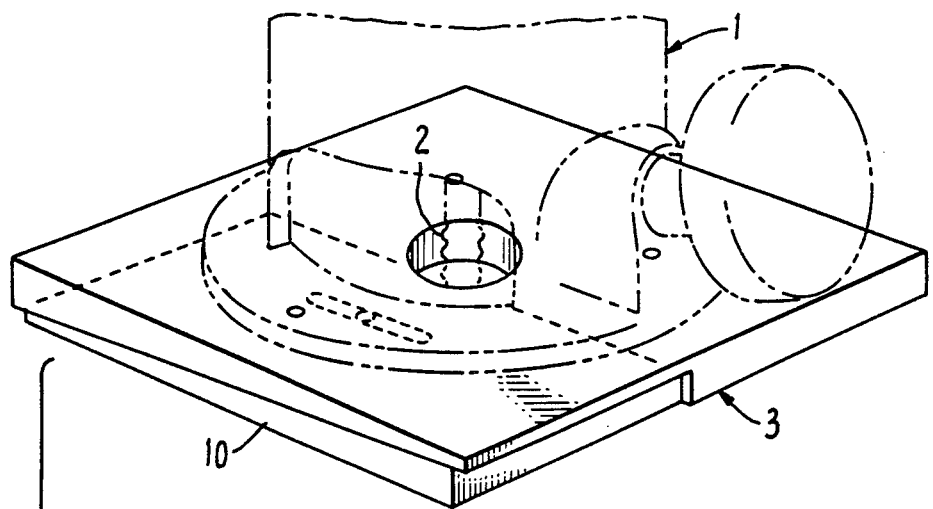
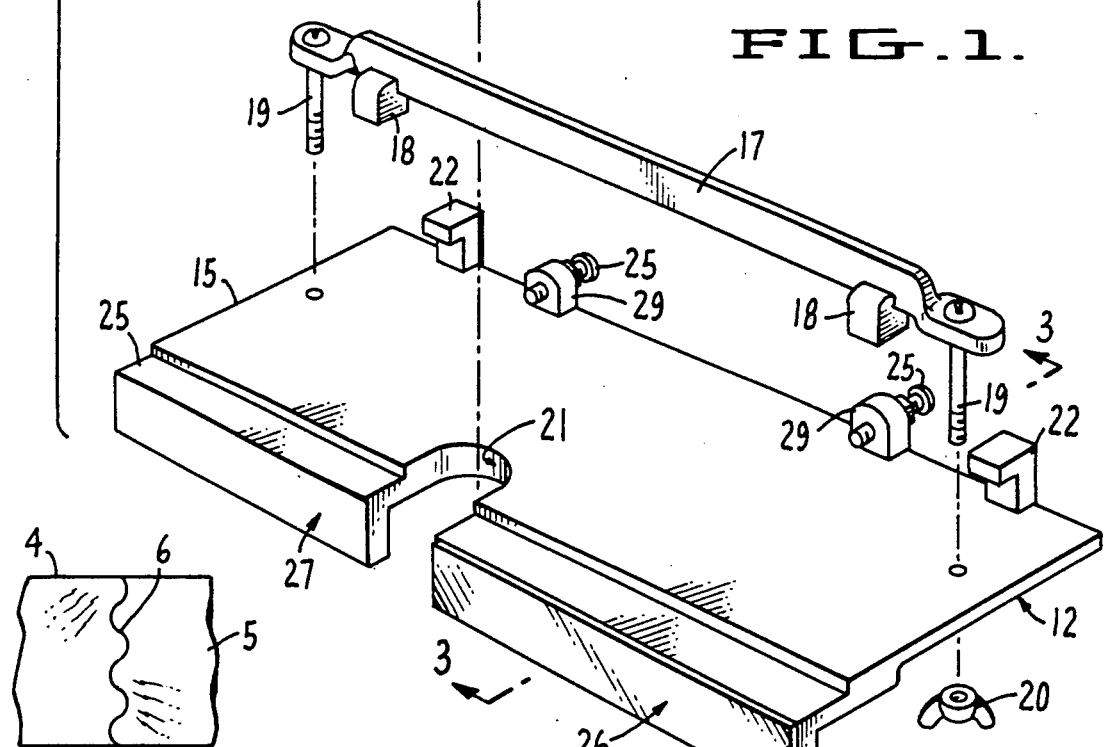
FIG. 1.
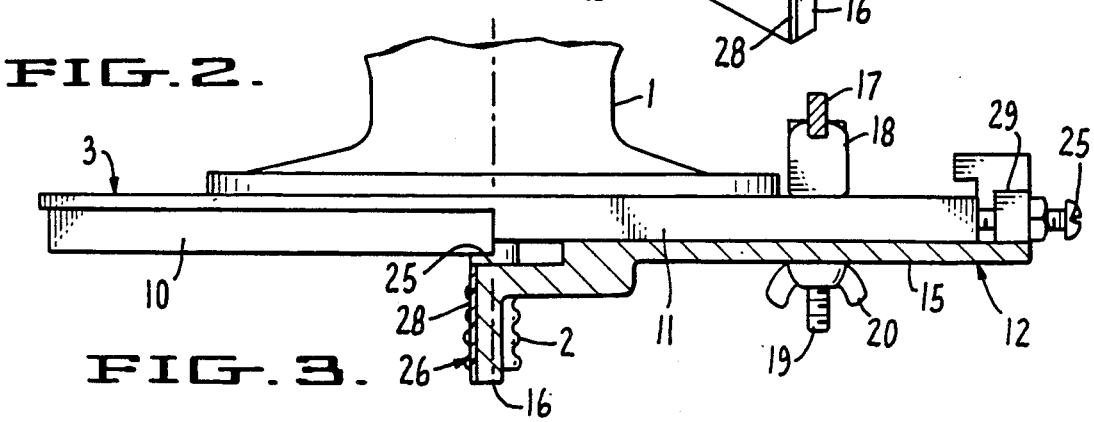
FIG. 2.
FIG. 3.

WORKPIECE GUIDE FOR PORTABLE POWER ROUTER

BACKGROUND OF THE INVENTION

This invention relates to portable power routers and more particularly to an attachable workpiece guide for edge jointing.

A portable power router usually is guided to shape the edge of a workpiece by tracking the router base in abutment with a straight-edge clamped to the workpiece. The operator moves the router base along the straight edge to guide the bit in its cutting action on the workpiece edge.

SUMMARY OF THE INVENTION

The workpiece guide of this invention comprises a guide rail which clamps to the router base at a preselected distance from the axis of rotation of the router bit. The guide rail extends below and generally at a right angle to the planar router base to define a workpiece guide surface relative to the bit. The guide surface at the feeding end of the guide rail is off-set from the guide surface at the discharge end of the guide rail so as to accommodate a preselected depth of cut on the workpiece. The workpiece guide is adjusted relative to the router bit by means of adjustment set screws.

BRIEF DESCRIPTION OF THE DRAWINGS

FIG. 1, is an exploded perspective view illustrating a portable power driven router and one embodiment of the workpiece guide that can be attached to the router base by a strongback;

FIG. 2 illustrates an edge joint formed by the curves cut in mating workpieces by the particular router bit illustrated in FIG. 1;

FIG. 3 is a side elevational view partly in section taken along line 3—3 of FIG. 1;

DESCRIPTION OF THE PREFERRED EMBODIMENT

Figure 4:
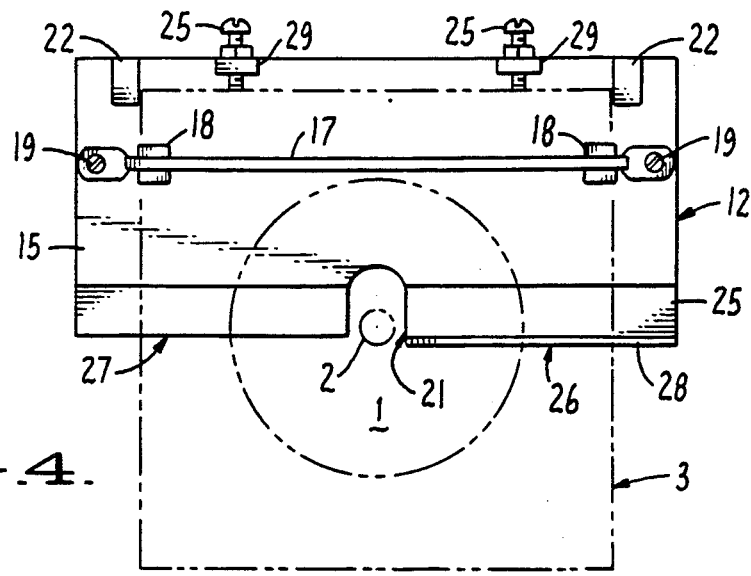
FIG. 4 is a top view of the workpiece guide of FIG. 1 with the router indicated in phantom lines.

FIG. 1, in exploded perspective, shows a first embodiment of the workpiece guide of this invention for attachment to a portable power router shown generally as 1. The router has a power driven bit 2 which protrudes through and below a generally planar router base 3. The power router which is illustrated is useful for edge jointing mating workpieces 4,5, as shown in FIG. 2, with curves cut into their edges by the illustrated configured bit to define joint 6.

The particular router that is illustrated has an adjustable stepped portion 10 of its planar base 3 which can be slid upon a ramp to vary the height of its planar surface relative to the planar surface of a fixed portion of the planar base indicated at 11 in FIG. 3. This enables the configured bit 2 to cut the appropriate configuration in the two workpiece edges for proper mating so as to define the joint 6 illustrated in FIG. 2. One workpiece runs against the bit 2 using stepped portion 10 of the base as a reference and the other workpiece uses fixed portion 11 of the base as a reference with the former adjusted to center the curves in the joint upon one another. Such routers and jointing systems are known in the prior art.

The attachable workpiece guide 12 in the embodiment shown in FIG. 1 comprises a planar plate 15 with an upstanding edge or rail 16 that serves as a workpiece guide. As shown in FIG. 3, the plate 15 fits upon the fixed portion of the router base 11 with the upstanding rail 16 defining guide surfaces relative to the configured router bit 2. The plate 15 also may mount upon stepped portion 10 of the router base. The workpiece guide 12 clamps to the router base 3 by means of strongback bar 17 having seats 18 which bear upon the top of the router base. Through bolts 19 and wing nuts 20 at each end of strongback bar 17 secure the workpiece guide 12 to the router base 3.

In the embodiment illustrated in FIGS. 1,3,4, guide rail 16 and plate 15 are recessed as at 21 to accommodate the router bit 2. Plate 15 of the workpiece guide also is relieved at 25 so as to clear the stepped portion 10 of the base as is more clearly shown in FIG. 3. The upstanding guide rail discharge surface 26 is generally parallel to feeding guide surface 27 but is offset from it to the left in FIGS. 1 and 3 by an amount of the depth of cut. This is accomplished by machining the guide surfaces from one piece or by an added facing 28, as shown, adhered to the guide rail 16 in order to develop the extended discharge guide surface 26.

The alignment of the guide surfaces 26,27 of the rail is adjusted relative to the router bit 2 by means of a pair of set screws 25 threaded into seats 29 mounted along one edge of the plate 15. As shown in FIG. 3 these set screws bear upon the router base 3 along one edge. L-shaped lugs 22 mount along the same edge of the plate 15 outboard of seats 26.

Figure 5:
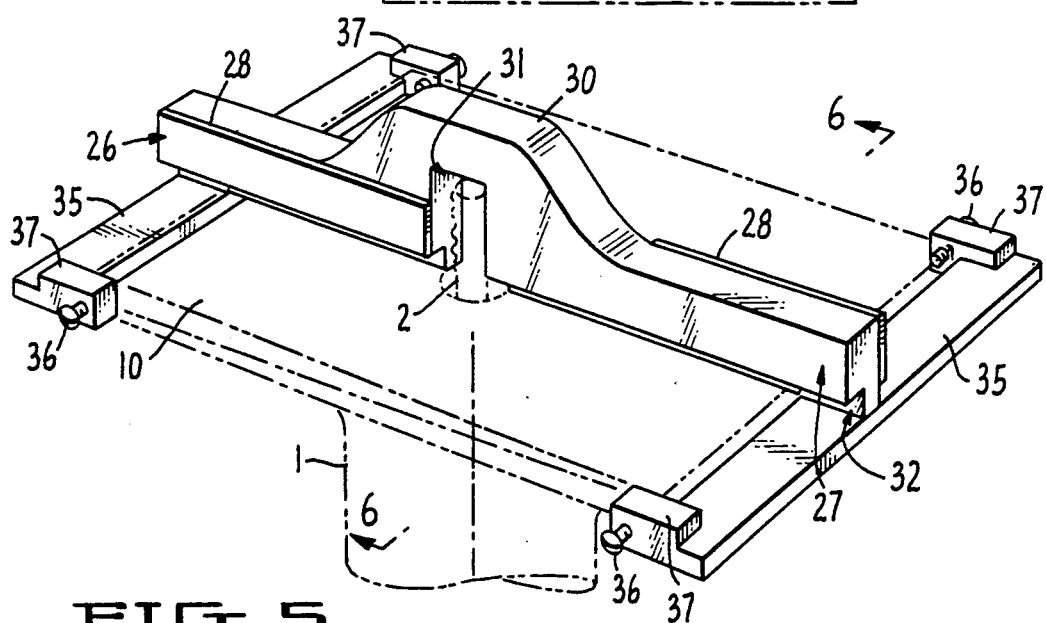
FIG. 5 is a perspective view of a second embodiment of the workpiece guide with the router indicated in phantom lines.
Figure 6:
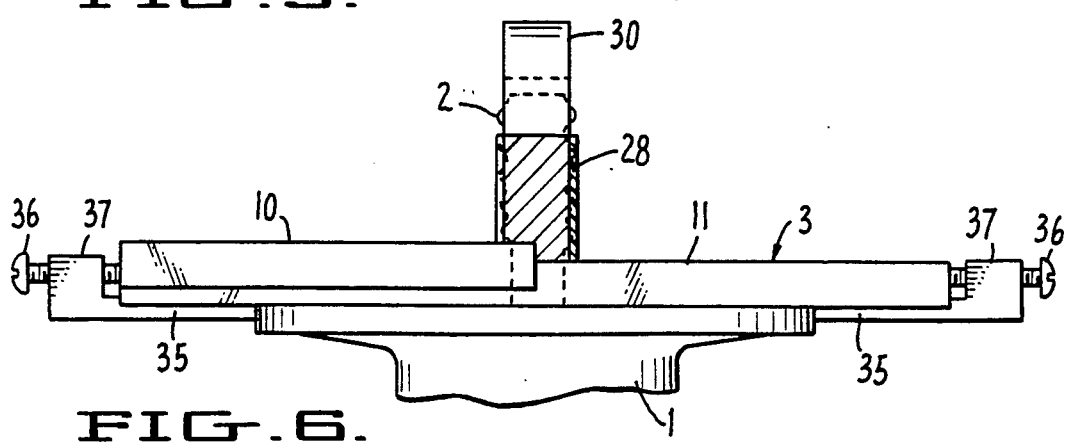
FIG. 6 is an end elevational view partly in section taken along line 6—6 of FIG. 5.

FIGS. 5 and 6 illustrate a second embodiment of the workpiece guide which is more or less a U-shaped rail 30 over the protruding router bit 2 and of a thickness relative to the bit 2 to provide guide surfaces on both sides of the rail 30. Its discharge guide surface 26 is in parallelism with but offset from the feeding surface 27 in a similar fashion as that described in connection with the embodiment of FIGS. 1,3,4. Guide rail 30 is recessed at 31 to accommodate the router bit. Each end of the guide rail 30 may carry a facing piece 28 to define the extended discharge surface 26 relative to the other end of that side of the rail. In this manner mating edges of both workpieces can be routed with a single placement of the guide rail 30.

The ends of rail 30 are carried upon respective mounting bars 35. The mounting bars each have a pair of set screws 36 threaded through seats 37 to bear upon the opposite edges of router base in order to adjust the guide surfaces 26,27 with respect to the router bit 2. These set screws 36 also clamp the guide rail to the router base.

I claim:

1. An attachable workpiece guide for a portable power router having a power driven bit protruding through and below a generally planar router base comprising a guide rail extending below the router base for defining workpiece guide surfaces relative to the router bit on each side of the rail;

means for securing the guide rail to the router base; and means for adjusting the location of the guide rail with respect to the router bit to control the depth of cut on a workpiece.

2. The attachable workpiece guide of claim 1 wherein the guide rail has a discharge end that has a guide surface parallel to but offset from the guide surface of the feeding end of the guide rail to accommodate a preselected depth of cut on the workpiece.

3. The attachable workpiece guide of claim 1 wherein each end of the guide rail carries a separate mounting bar adjacent an end of the router base.

4. The attachable workpiece guide of claim 3 wherein the means for adjusting the location of the guide rail comprises a pair of set screw threaded through each mounting bar and bearing upon the router base.

5. The attachable workpiece guide of claim 1 wherein the guide rail thickness is less than the diameter of said router bit and is recessed near its center to accommodate the router bit in said recess.

* * * * *